H. J. GAISMAN.
PHOTOGRAPHIC APPARATUS.
APPLICATION FILED MAR. 29, 1912.
1,359,245. Patented Nov. 16, 1920.
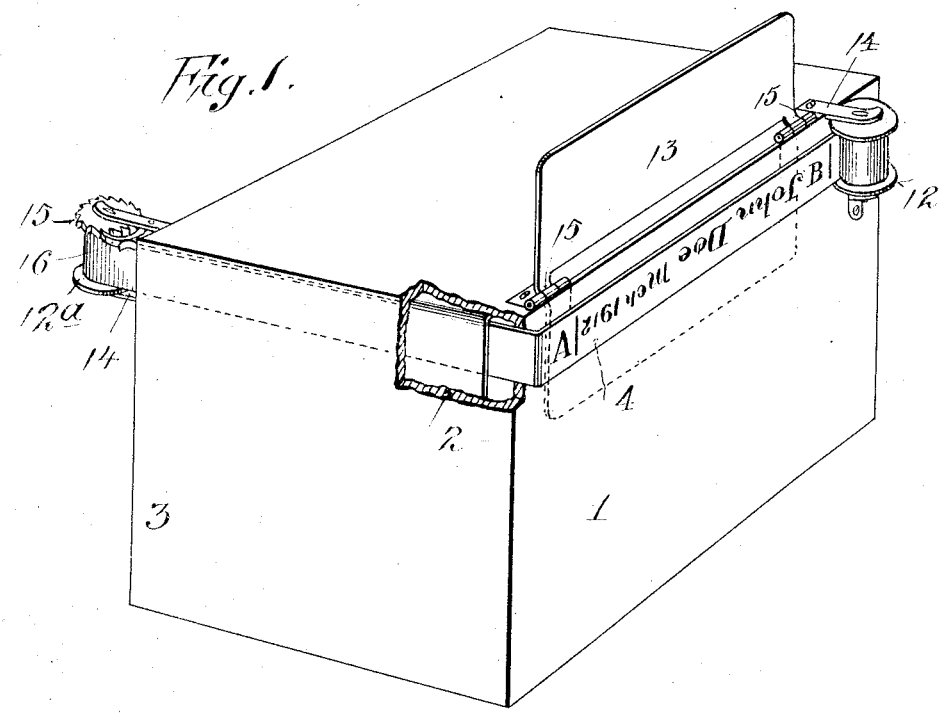
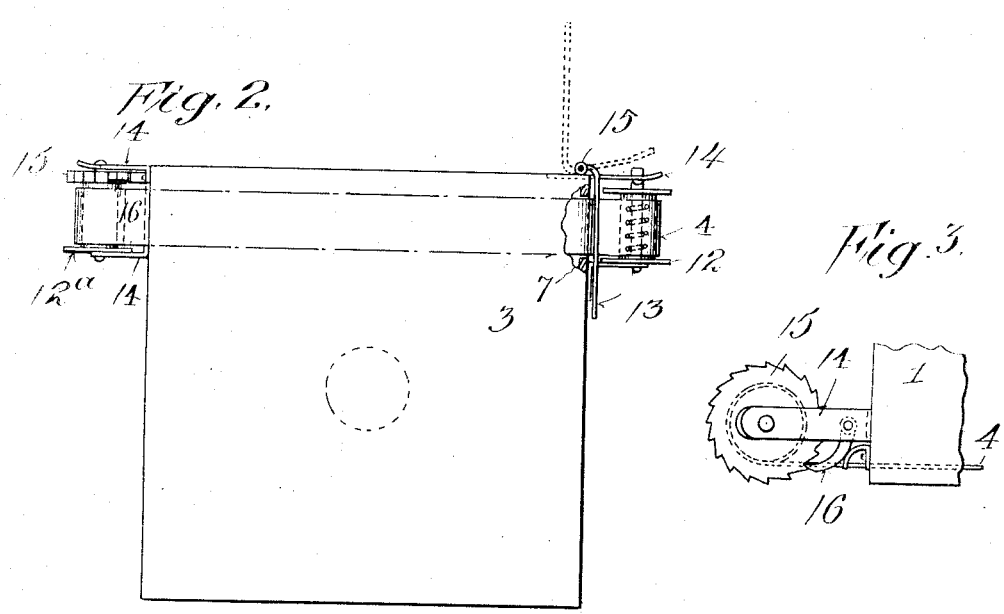
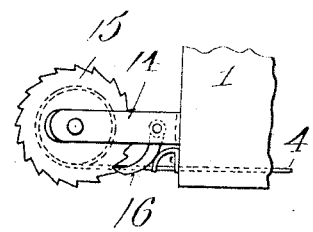

UNITED STATES PATENT OFFICE.

HENRY J. GAISMAN, OF NEW YORK, N. Y., ASSIGNOR TO EASTMAN KODAK COMPANY, OF ROCHESTER, NEW YORK, A CORPORATION OF NEW YORK.

PHOTOGRAPHIC APPARATUS.

1,359,245.  Specification of Letters Patent.  Patented Nov. 16, 1920.

Original application filed March 23, 1911, Serial No. 616,428. Divided and this application filed March 29, 1912. Serial No. 687,016.

*To all whom it may concern:*

Be it known that I, HENRY J. GAISMAN, a citizen of the United States, and resident of New York city, borough of Manhattan, in the county of New York and State of New York, have invented certain new and useful Improvements in Photographic Apparatus, of which the following is a specification.

This application is a division of my application for patent on photographic apparatus, filed March 23, 1911, Serial No. 616,428.

The object of my invention is to provide improved means for causing the desired designations to be photographed upon a negative plate, or film, such as the name, initials, date, title of object photographed, etc.

The terms "negative producing material", "plate", and "film" just employed may be hereinafter used as alternative designations of a photographically sensitized element; it being understood that in referring to the sensitized element or the alternative terms just mentioned or their equivalents, I intend to include any member or device such as glass, celluloid, paper, cloth or other objects for carrying or containing an emulsion or coating which, when exposed to actinic light by projection of the image as in the use of a lens or by contact as in the common practice of printing by photography shall be regarded as coming within the terms stated.

In carrying out my invention I provide means to enable the name, date or other designation or indication to be written or produced at will upon a transparent or partially transparent member or strip, and to place such member or strip in position to cause such designation to be photographed upon the film during exposure to the lens, so that when the negative is developed, such designation will appear upon the negative or film and will be produced upon the printed photograph.

My invention comprises novel details of improvement and combinations of parts that will be more fully hereinafter set forth and then pointed out in the claims.

Reference is to be had to the accompanying drawings forming part hereof, wherein, Figure 1 is a perspective view of a camera equipped with a continuous strip upon which the desired designations may be written exterior to the camera for exposure to the lens, showing the rest for the hand in operating position;

Fig. 2 is a side view of Fig. 1, illustrating the rest folded; and

Fig. 3 is a detail of strip controlling devices of Figs. 1 and 2.

Similar numerals of reference indicate corresponding parts in the several views.

The camera or photographic apparatus 1 may be of any suitable or wellknown construction, and may be adapted for use with negative producing material of any suitable or wellknown character, such as flexible films or plates, supported and operated in any wellknown or desired manner. The film 2 may be adapted to pass across the usual opening inclosed by a door or lid 3 opposite the film. At 4 is a slip or strip of transparent material, such as gelatin, celluloid or the like, upon which may be written a name, initials, date, object photographed or other desired indication or designation to be placed in front of the sensitive face of the film or plate to photograph such indication thereon upon exposure of the film. The strip 4 is illustrated as adapted to pass through the camera in front of the sensitive face of the film, and for this purpose I have shown rollers 12, 12ª detachably carried upon brackets 14 supported by the camera, to which rollers the strip 4 is connected. Said strip passes across the outer surface of one side of the camera and through slots 7 produced in opposite walls of the camera so that the strip 4 may pass across and in front of a suitable portion of the film. Strip 4 is thus exposed on the exterior of the camera in position to enable the photographer to write the desired name, date, or other designation on the strip before the same passes through the camera. To aid in writing upon strip 4 I provide a hand rest or shelf 13, which is shown hinged at 15 at an edge of the camera, the hinges being shown of such nature as to normally retain the rest 13 in an extended position as it appears in Fig. 1, and so as to allow the rest 13 to be folded over the exposed portion of the strip 4, as in Fig. 2. One of the rolls, such as 12, may be provided with a spring in the nature of a shade roller, and the other roll, such as 12ª, may be provided with means to prevent reverse rotation of the roll, and thereby maintain tension on the strip. For this purpose I have shown roll 12ª provided with a ratchet wheel 115 engaged by a spring pressed dog 16, shown carried by a bracket 14. When a designation has been written upon strip 4, the roller 12ª is revolved until the part of strip 4 having such designation is within the camera, and the designation on the strip is in front of the film. Such designation may be maintained in position for one or more exposures, and different designations can be made upon strip 4 for any desired exposures.

The specification and claims have or will contain reference to one of the elements employed in the invention by the alternative terms "slip, strip or member" and I desire it to be understood that the said terms are intended to include any suitable material of any desired dimensions, adapted to receive manual markings thereon and adapted to be placed in the field of exposure whereby light is admitted through said strip to photographically reproduce the marking on the strip, regardless of whether any marking material impervious to light is manually applied to the said material to produce the desired designations on the strip or whether the marking is effected by removing portions of previously applied coating impervious to light. In either of such forms of producing manual designations upon a strip the latter is to be translucid to permit the light to pass through it, either when it is written upon manually to produce the designation thereon, or when the said coating impervious to light has been partially removed to produce the designation thereon.

The foregoing disclosure is illustrative of one embodiment of the invention, which is made for the purpose of disclosing the broad aspect of said invention, though it is not regarded as the only method or means for carrying the invention into practice, within the scope of the claims.

The continuous strip may be provided with any suitable marks, numbers, or the like, indicated at A, B to show the space available for writing upon to be exposed to the film or negative for the next picture to be taken.

It will be understood that the strip in front of the exposure or sensitive face of the film or negative producing material is unobstructed and wholly exposed to the latter, and is unsupported in front of the film so that undesired lines or markings will not be photographed upon the film or negative producing material.

By the term "negative producing material" I mean a sensitive film or plate of any well known character.

Changes may be made in the details of construction and arrangements of parts set forth, within the scope of the appended claims, without departing from the spirit of the invention as for instance, although the invention is shown applied to a device termed a camera, which designation usually includes a lens as a part of its equipment, the invention lies in the means for forming the designations on a sensitized surface in a holder whether this is permanently associated with a lens and shutter or is removable from and capable of application to a camera proper or other means for causing light to fall on the sensitized surface and light-print the desired designations thereon.

Having now described my invention what I claim is:—

1. The combination with a holder for sensitized photographic material adapted to be exposed to light, of a strip adapted to receive markings to be light printed on the material, means for supporting said strip so that a portion thereof may receive markings exteriorly of the holder and said marked portion be moved within the holder into a field of exposure.

2. In combination with means for containing and for exposing a sensitized element to light, a strip of material having a portion readily accessible from the exterior of the holder so as to receive markings, the marked portion of which is movable into the field of exposure of the sensitized element and means for holding the marked portion of said strip in said field.

3. The combination with a holder for photographic sensitized material, of a strip adapted to receive marking exteriorly of the holder and having designations thereon indicating the space to be marked, means for supporting said strip so that a portion thereof may receive markings exteriorly of the holder and the marked portion be brought within the field of exposure within the holder.

4. The combination with a holder for sensitized photographic material, of a movable translucid strip adapted to receive manually applied markings to be light printed on the material in the holder and means for guiding and supporting said strip alongside the exterior of the holder for the application of the markings thereto and also within the holder to carry the manually marked portion into the field of exposure whereby the markings may be exteriorly applied to the strip and subsequently light printed on the sensitized material.

5. The combination with a camera, of a strip of material, said camera having means for supporting the strip extending transversely of the same, with means for holding the strip along the outer face of one side of the camera and a rest movably supported on the camera adjacent said strip and adapted to open outwardly to fold over the exposed part of said strip.

6. The combination with a camera having openings of rollers carried upon the camera, one of said rollers being provided with a spring tending to rotate it, the other roller being provided with means to prevent reverse rotation, a strip of material extending between rollers exposed at one part on the exterior of the camera in position to be written upon and movable to bring said writing in the field of exposure and having another part thereof passing within the camera.

7. The combination with a camera having openings, of rollers carried upon the camera, one of said rollers being provided with a spring, tending to rotate it, the other roller being provided with means to prevent reverse rotation, a strip of material wound on the rollers and exposed at one part on the exterior of said camera in position to receive writing thereon, said strip extending within the camera to bring the writing in the field of exposure, and a rest on the camera for the said strip.

8. The combination with a camera having openings, of rollers carried upon the camera, one of said rollers being provided with a spring, the other roller being provided with means to prevent reverse rotation, and a strip on the rollers having a portion thereof exposed on the exterior of the camera in position to receive writing thereupon, another portion of said strip passing through the camera, said camera having a rest adjacent said strip, means for movably supporting the rest upon the camera to fold over the exposed part of the strip, and also to expose such part of the strip in writing position.

9. A camera provided with means for supporting a strip of unsensitized translucid material extending over the sensitized element in the field of exposure, the opposite edges of said strip being unsupported in said field.

10. In a device for containing a sensitized element, means for exposing said element to light, a translucid strip adapted to have indicia manually inscribed thereon, and means for moving any inscribed portion of the strip into the field of exposure of the sensitized element.

11. In an apparatus relating to photography, means for containing a sensitized element, means for exposing the sensitized element to light, a strip of translucid material accessible from the exterior of the apparatus for manually writing thereon, and means for moving the inscribed portion of the strip into the field of exposure of the means for exposing the sensitized element to light.

12. In an apparatus relating to photography, means for containing a sensitized element, means associated therewith for exposing the sensitized element to light, a translucid member adapted while in position on the apparatus to receive identifying indicia, and means for holding the portion of the member carrying the indicia between the means for exposing the sensitized element to light, and the said sensitized element to light print said indicia on the element.

13. The combination with a holder for sensitized photographic material, of a band adapted to receive autographic markings or designations thereon, movably mounted on the holder, a portion of said band being accessible from the exterior of the holder for the application of said designations and the same portion on which the designations are made being movable within the holder and in proximity to the sensitized material to intercept light falling thereon and light print said designations upon it.

14. The combination with a holder for sensitized photographic material, of a movable band adapted to receive autographic markings or designations thereon, extending over and supported by a portion of the exterior of the holder for the application of the designations thereto, the portion of the band so marked being movable within the holder in proximity to the sensitized material and between it and light entering the holder to cause said designations to be light printed on said material.

15. The combination with a holder for photographic film, of a movable band of material adapted to receive writing or markings thereon extending in front of the film within the holder and also upon the exterior thereof to permit writing thereon, the portion so marked being movable between the film and light to cause said markings to be light printed on the former.

16. A casing having a controllable exposure opening and within which casing a sensitized photographic element may be protected from light and held in position for exposure, said casing being provided with a translucid member through which light may be transmitted to print upon a sensitized element thus positioned, said member having a surface accessible from the exterior of the casing without admitting light to the interior thereof, said surface being adapted to receive an inscription differing in light transmitting properties from the remainder of said surface, and controllable means whereby light may be admitted through said inscribed member to light print its inscription on said sensitized element.

17. A casing having a controllable exposure opening and within which casing a sensitized photographic element may be protected from light and held in position for exposure, a translucid member having a surface adapted to receive an inscription differing in light transmitting properties from the remainder of said surface, said casing being provided with means by which said member and said sensitized element are adapted to be adjusted either into or out of printing relation without admitting light to said sensitized element, and controllable means whereby light may be admitted through said inscribed member when in printing relation to light print its inscription on said sensitized element.

18. A casing having a controllable exposure opening through which a picture may be taken and within which casing a sensitized element may be protected from light and held in position for exposure, said casing being provided with a translucid member having a surface adapted to receive an inscription differing in light transmitting properties from the remainder of said surface, and which surface is accessible from the exterior of the casing to receive an inscription without admitting light to the interior of the casing, said member and said element being so related to each other and to said exposure opening that the inscription on the member may be printed upon said element by light admitted through said exposure opening.

Signed at New York city, in the county of New York, and State of New York, this 28th day of March, A. D. 1912.

HENRY J. GAISMAN.

Witnesses:
  T. F. BOURNE,
  MARIE F. WAINRIGHT.